July 3, 1962 — E. G. PICKELS ET AL — 3,041,921
POLARIMETER APPARATUS
Filed Nov. 17, 1958 — 2 Sheets-Sheet 1
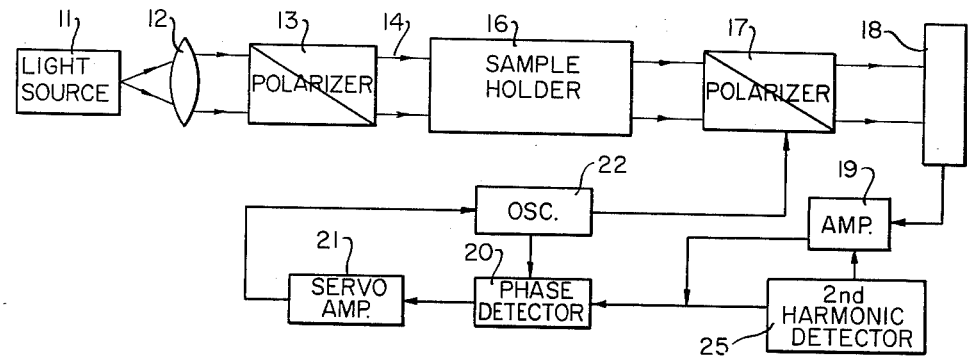
FIG. 1
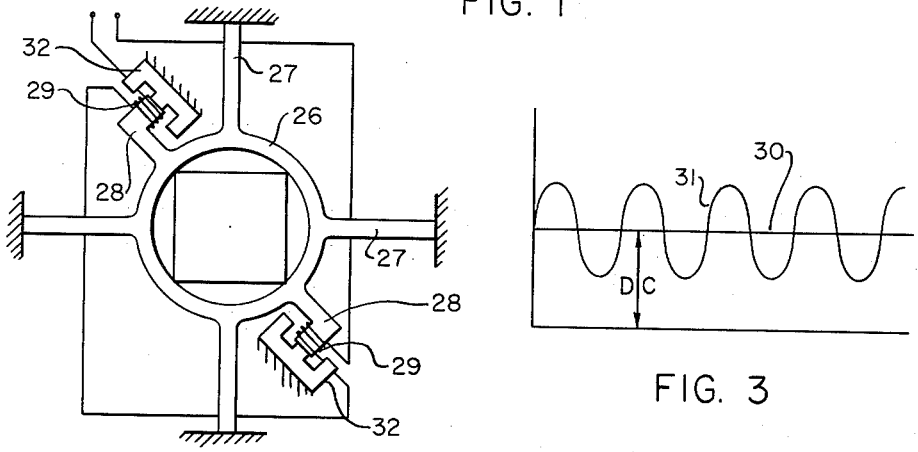
FIG. 2
FIG. 3
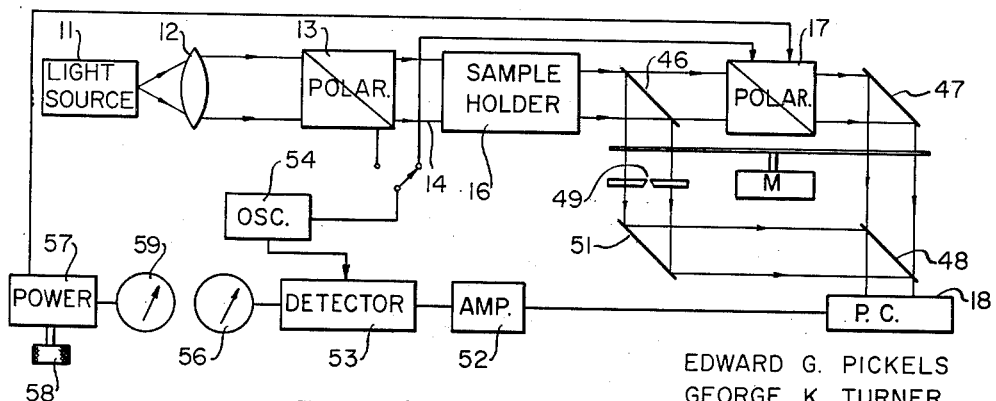
FIG. 4
EDWARD G. PICKELS
GEORGE K. TURNER
INVENTORS
BY
Flehr and Swain
ATTORNEYS July 3, 1962　　　E. G. PICKELS ET AL　　　3,041,921
POLARIMETER APPARATUS
Filed Nov. 17, 1958　　　　　　　　　　　　2 Sheets-Sheet 2

EDWARD G. PICKELS
GEORGE K. TURNER
INVENTORS

BY
Flehr and Swain
ATTORNEYS

United States Patent Office 3,041,921
Patented July 3, 1962

3,041,921
POLARIMETER APPARATUS
Edward G. Pickels, Atherton, and George K. Turner, Palo Alto, Calif., assignors to Beckman Instruments, Inc., a corporation of California
Filed Nov. 17, 1958, Ser. No. 774,323
7 Claims. (Cl. 88—14)

This invention relates to polarimeter apparatus.

Many substances are optically active and polarimetry may be used as a tool in determining their molecular structure. Polarimetry being an important tool in the analysis of many chemical solutions, it is desirable to provide a system which is relatively accurate. The rotation of the plane of polarization of light by the sample under test may be in the order of thousandths of one degree. Thus, apparatus in which small angular rotations may be detected and measured is desirable.

Certain prior art polarimeters employ a first polarizer in which a light beam is plane polarized prior to its travel through a sample whose optical characteristics it is desired to analyze. An analyzer which is mounted in bearings and suitably driven, as for example, by gears serves to receive the transmitted light and determine the rotation of the plane of polarization imparted by the sample. Generally, the analyzer comprises a second polarizer which is adjusted so that its plane of polarization is perpendicular to that of the first. The polarizer is rotated from its zero position, obtained without a sample, until the transmission is reduced to a minimum. The amount of rotation required is a measure of the optical rotation imparted by the sample. Generally, the rotation is directly measured. In most instances, the amount of rotation is relatively small. Thus, it is difficult to accurately determine and measure the relative angles of the first polarizer and the analyzer polarizer for minimum transmission. Because of the small angles involved, friction between the moving parts, play between the parts, backlash in associated gearing and the like introduce errors which may be comparable to the rotation which it is desired to measure.

It is a general object of the present invention to provide an improved polarimeter apparatus.

It is another object of the present invention to provide a polarimeter apparatus in which the minimum transmission position and angle of rotation may be accurately determined.

It is another object of the present invention to provide an analyzing apparatus in which one of the polarizers is vibrated through a small angle about a mean position.

It is another object of the present invention to provide a polarimeter apparatus in which the output is biased in such a manner that the readings are obtained away from the minimum value.

It is another object of the present invention to provide a polarimeter apparatus in which one of the polarizers is vibrated around a mean position and in which the phase of the output signal provides an indication of the proper positioning of the analyzer.

These and other objects of the invention will become more clearly apparent from the following description when taken in conjunction with the accompanying drawing.

Referring to the drawing:

FIGURE 1 schematically shows one embodiment of the present invention;

FIGURE 2 shows a suitable analyzer mount;

FIGURE 3 shows the signal applied to the coils of the mount of FIGURE 2;

Figure 5:
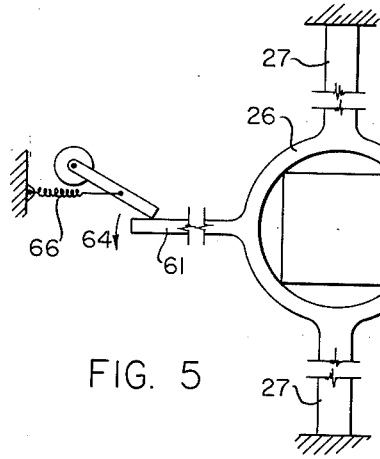
Figure 6:
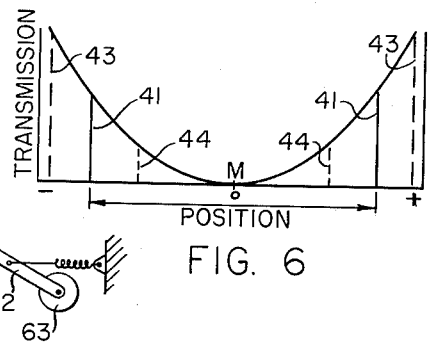
Figure 8:
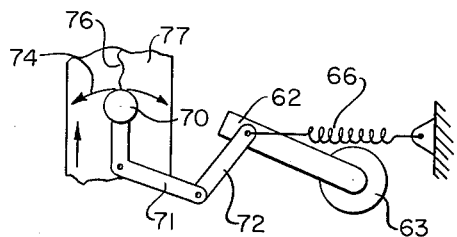
Figure 7:
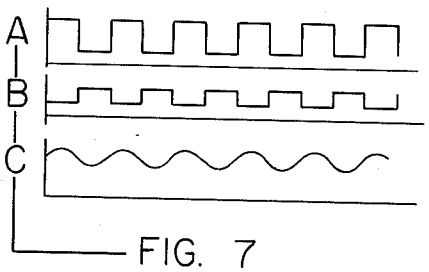
Figure 9:
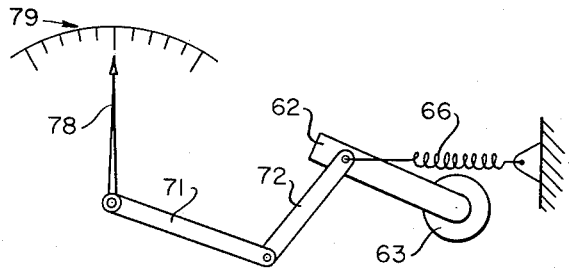

FIGURE 4 schematically shows another embodiment of the present invention;

FIGURE 5 shows another means for mounting the analyzer;

FIGURE 6 is a curve of the transmission as the analyzer approaches the zero transmission position;

FIGURE 7 shows the voltage waveforms obtained at various points in the circuit of FIGURE 4;

FIGURE 8 shows a mechanical linkage for driving a pin of a strip chart recorder from the analyzer; and FIGURE 9 shows a mechanical linkage for driving an indicating pointer.

Referring to FIGURE 1, there is provided a monochromatic light source 11. The light from the source impinges upon a collimating lens 12 which renders the rays of light parallel. The parallel rays are applied to a first polarizer 13 which may be a polarizing prism or any other suitable polarizer. The polarizer 13 serves to form a plane polarized light beam 14. The light rays then travel through the sample placed in the holder 16. The polarized light is rotated in accordance with the optical properties of the sample. The transmitted light impinges upon a second polarizer 17 herein referred to as analyzer which may also comprise a polarizing prism. The light transmitted by the analyzer impinges on a transducer 18, for example, a photomultiplier tube, which converts the light energy into electrical energy. The transducer should preferably have a low signal to noise ratio, good linearity and a relatively large receiving surface.

The electrical signal may be amplified 19 and applied to a phase detector 20 which serves to detect the component of the electrical signal from the transducer which is synchronous with the vibration of the analyzer while rejecting all other signals to a high degree. The phase detector 20 further differentiates between signals which are a maximum when the analyzer is vibrated to one extreme of its rotation and signals which are a maximum when it is vibrated to its other extreme. The detector gives outputs of opposite polarity for these conditions. The output of the phase detector is applied to an amplifier 21 whose output is added to the output of the oscillator 22. The combined signal is applied to means for rotating and vibrating the analyzing prism, to be presently described. A signal from the oscillator 22 is also applied to the phase detector 20.

Referring particularly to FIGURE 2, a suitable mounting and drive for the analyzer 17 is shown. The analyzer 17 is suitably mounted in a frame 26. Radially extending spring arms 27 are suitably secured to or form part of the frame. The arms have their ends fixed against rotative movement. The frame also carries armatures 28 provided with windings 29. The windings of the two armatures are interconnected (series or parallel) and have applied thereto the combined signal from the oscillator and phase detector.

The applied signal is of the type shown in FIGURE 3 which includes a D.-C. component 30 corresponding to the output of the phase detector, and an A.-C. component 31 corresponding to the output of the oscillator. The signal serves to energize the coils to set up a magnetic field in the armature. A suitable hollow magnetic core 32 with an independently established magnetic field is fixedly mounted with respect to the armatures and serves to receive the same. As the magnetic field in the armature changes, the armature will be urged further into the core or out of the core depending upon the polarity and strength of the D.-C. signal component. Since the armatures are directly secured to the frame 26, this will cause the frame to rotate against urging of the spring arms 27. The combined D.-C. and A.-C. signal will serve to rotate the analyzer through an angle which may be made proportional to the current flowing in the armature 28 to a high degree of precision and to dither or vibrate the analyzer through a small angle about this position.

Preferably, the analyzer mount is designed and constructed so that it will be mechanically resonant at the oscillator frequency. The system could be designed where this elements forms the frequency determining circuit of the oscillator. By making the mount resonant, as described, the analyzer will dither symmetrically about the minimum transmission position.

The vibration or dither of the analyzer will cause an A.-C. signal to continuously appear at the output of the transducer 18. This A.-C. will have a component at the frequency of the analyzer motion with a magnitude dependent upon the average position of the analyzer with respect to the position required for minimum transmission, and a phase dependent upon whether this average position is above or below that required for minimum transmission.

The above described apparatus forms a system which causes the D.-C. component of current flowing in the armature, and hence the rotation of the analyzer to seek the minimum transmission angle. If high gain amplifiers are employed, the analyzer current becomes essentially independent of variations of amplifier gain, light level, etc., over a wide range, and is a true measure of the rotation required to cause the analyzer to reach the minimum transmission position. The current may be employed to drive a strip chart or other type of recorder to provide a permanent continuous record.

Where the monochromatic light source is caused to scan over a wide range of wavelengths, extreme variations in light level may be encountered. The system might tend to become unstable. However, the output of the transducer contains second harmonics of the dither frequency which are proportional to the light level and essentially independent of the error from minimum transmission. These may be employed to control the gain of the system whereby it can operate stably over a wide range of light values.

Referring to FIGURE 1, the output of the amplifier 19 may be applied to a second harmonic detector 25 whose output is employed to control the gain of the amplifier 19. Alternatively, the detector output may control the voltage applied to the transducer.

Referring to FIGURE 4, another embodiment of the invention is shown. In the embodiment of FIGURE 4, a light bias is provided whereby the dithering takes place around a fixed bias value away from the minimum value "M." This will be more clearly understood with reference to FIGURE 6. In the example just described, the dithering takes place about the minimum point "M" whereby the output signal will only be dependent upon the relatively small difference between the signals as the prism is dithered around the minimum value. By applying a steady source of light or light bias, the input to the photocell or transducer will always be a minimum value which is indicated by the lines 41. Thus, the dithering will take place about either of these lines going above and below as indicated by the dotted lines 43 and 44, respectively. The photocell is then connected to obtain the difference of the signals and this difference will change in phase with errors in positioning of the prism about the mean value. The advantage of the present system is that the actual changes will be somewhat greater because of the slope of the cut-off curve being greater. Thus, the differences for the same angle will be greater.

Referring now to FIGURE 4, a monochromatic source 11 supplies light to the collimating lens 12 which forms parallel rays. The rays are applied to a polarizer 13 which forms plane polarized light rays 14 which are transmitted through the sample contained in the holder 16. The rays which are transmitted through the sample impinge upon a partially transmitting mirror 46. A predetermined portion of the rays travel through the mirror and through the analyzer 17 where they impinge upon a mirror 47 and are reflected through a partially transmitting mirror 48 to the photocell 18.

A portion of light reflected by the mirror 46 travels through an adjustable slit 49 to a reflecting mirror 51 to the mirror 48 where it is diverted to provide a steady source of light or light bias to the photocell 18. Thus, the photocell 18 receives an adjustable amount of light which has not travelled through the analyzer 17 and light which has travelled through the analyzer 17. That portion which does not travel through the analyzer 17 is not affected by the deflection of the analyzer. Therefore, the light which is reflected by the mirrors 46, 51 and 58 provides the bias indicated by either of the lines 41 in FIGURE 6.

A suitable light chopper 45 serves to alternately interrupt the light beams from the mirrors 46 and 47 whereby beams from these two mirrors are alternately impinging upon the photocell 18. The output of the photocell will be of the type shown in FIGURES 7A–7C, wherein FIG. 7A represents the light which travels directly to the photocell, while FIG. 7B represents the light which has travelled through the analyzing prism. The outputs are additive and the output signal will be of the type shown in FIG. 7C.

The output of the photocell is applied to an amplifier 52 and the amplified signal to detector 53. An oscillator 54 serves to dither either the prism 13 or the prism 17 as the case may be. The output of the oscillator is also applied to the detector 53. The output of the detector is indicated on a meter 56. A source of power 57 which may be manually adjusted by a knob 58 serves to supply power to rotate the analyzer 17. The amount of power may be measured by meter 59 which then gives an indication of the deflection. The system of FIGURE 4 which is a manually operated system is merely illustrative of the possibilities of the system since it will be apparent that an automatic system of the type shown in FIGURE 1 may be employed in this system.

The analyzer 17 may be mounted in a holder of the type previously described or may be mounted in a holder of the type shown in FIGURE 5. The analyzer 17 is again mounted in a frame 26 which has outwardly extending spring arms 27 having their ends suitably fixed. The analyzer 17 is disposed in such a manner that the light from the sample 16 passes therethrough. Radially extending arms 61 are provided and have a spring constant which is substantially less than the spring constant of the arms 27. Thus, in order to rotate the prism 17 through a predetermined angle, the arms 61 must be deflected by an amount which corresponds to the ratio of the spring tension of the arms 27 and 61. For example, if the arms 27 have a spring constant which is ten times that of arms 61, ten times the movement of the ends of arms 61 will be required to move the prism 17 through a predetermined angle as would be required if the arms had the same constant. Energization of a solenoid or servo motor (neither shown) may serve to rotate the arm 62 in the direction indicated by the arrow 64 to urge the arms 61 in a direction to correctly position the prism. The solenoid or servo motor may be connected to the arm 62 in any conventional manner to provide the desired motion. A pen may be mechanically linked to the arm 62 and give a record of the position. On the other hand, a pointer may be suitably coupled to the arm 62 and serve to give a scale reading. In any event, actual rotation is multiplied by an amount corresponding to the difference in spring constant and thus will give a reading which is easily obtained and which is highly accurate.

Preferably, in order to maintain the force required to deflect the arm 61 constant, the arm 62 may be spring loaded by spring 66. The spring 66 serves to provide a variable force to the arm which force increases with deflection.

Referring to FIGURE 8, a suitable linkage for driving a pen 70 is illustrated. Thus, the arm 62 is secured to the crank 71 by means of a linkage 72. As the arm 62 moves, the crank 71 moves to move the pen 70 in a path indicated by the line 74. The pen serves to trace a curve 76 on the chart 77 which is driven in cooperative relationship therewith. Referring to FIGURE 9, a similar linkage is shown for driving a pointer 78 which operates in conjunction with scale 79 to give a visual indication of the displacement.

It should be pointed out that the first polarizer and the analyzer may each be mounted as described. One may then be dithered and the other rotated. Operation is essentially as described above. However, it would simplify the problem of achieving a symmetrical dither.

Thus, it is seen that an improved polarimeter apparatus is provided. The apparatus includes means for giving an accurate electrical, visual or recorded indication of the rotation of the plane of polarization of a light beam by the sample through which it travels. The apparatus also provides means for accurately determining the relative position of the polarizer and analyzer at minimum transmission.

We claim:

1. A polarimeter for measuring the optical rotation characteristics of a sample comprising a source of light, a first polarizer for plane polarizing the light, means for mounting said polarizer, a sample holder disposed whereby the plane polarized light travels through the sample contained in the holder, analyzing means comprising a second polarizer, means for mounting said second polarizer, means for dithering one of said polarizers through a small angle at a predetermined frequency, the mounting of said dithered polarizer having a resonant frequency substantially equal to the dither frequency, means for receiving the light transmitted by the second polarizer and forming an output electrical signal, and means for receiving said electrical signal and forming an output signal indicative of the rotation imparted to the polarized light by the sample.

2. A polarimeter for measuring the optical rotation characteristics of a sample comprising a base member, a source of parallel light having a fixed position with respect to said base member, a first polarizer for plane polarizing the light, a sample holder disposed whereby the plane polarized light travels through the sample carried by the holder, analyzing means comprising a second polarizer, means for mounting said second polarizer comprising a frame, holding the polarizer, said frame including at least a pair of radially extending spring arms fixedly secured at their ends with respect to said base member, said second polarizer being fixedly secured with respect to said frame, means for vibrating the frame and, therefore, said second polarizer through a small angle, means for receiving the light transmitted by the second polarizer and forming an electrical signal, and means for receiving said electrical signal and forming an output signal proportional to the rotation imparted to the light by the sample, and means for receiving said output signal and rotating said frame against the urging of the spring arms to position the analyzing means.

3. Apparatus as in claim 2 wherein said means for moving one of said polarizers through a small angle acts upon the analyzing means.

4. A polarimeter for measuring the optical rotation characteristics of a sample comprising a source of parallel light, a first polarizer for plane polarizing the light, a sample holder disposed whereby the plane polarized light travels through the sample held by the holder, analyzing means comprising a second polarizer which is rotatably mounted and disposed to receive a first portion of the light transmitted by the sample, means positioned between the sample and the second polarizer for deflecting a second portion of the light transmitted by the sample, means for vibrating one of said polarizers through a small angle, photoelectric means for receiving the deflected transmitted light and the light transmitted by the second polarizer and forming an electrical signal, and means receiving said electrical signal and forming an output signal.

5. Apparatus as in claim 4 which includes a light chopper alternately applying light transmitted by the sample and by the second polarizer to the photoelectric means.

6. Apparatus as in claim 4 wherein means are provided for adjusting the intensity of the deflected light.

7. A polarimeter for measuring optical rotation characteristics of a sample comprising a source of parallel light, a first polarizer for plane polarizing the light, a sample holder disposed whereby the plane polarized light travels through the sample contained in the holder, analyzing means comprising a second polarizer which is rotatably mounted, means for vibrating one of said polarizers through a small angle, means for receiving the light transmitted by the second polarizer and forming an electrical signal, amplifying means serving to receive and amplify said electrical signal, a phase detector connected to receive said amplified signal and form an output signal proportional to the rotation imparted by the sample to the plane of polarization of the light, means responsive to said output signal serving to position said analyzing means, a detector serving to detect the signal at the second harmonic of the vibrating frequency and form a control signal and means responsive to said control signal for controlling the gain of said polarimeter system.

References Cited in the file of this patent

UNITED STATES PATENTS

| | | |
|---|---|---|
| 548,701 | Crehore | Oct. 29, 1895 |
| 2,438,422 | Stearns et al. | Mar. 23, 1948 |
| 2,731,875 | Gould | Jan. 24, 1956 |
| 2,829,555 | Keston | Apr. 8, 1958 |

FOREIGN PATENTS

| | | |
|---|---|---|
| 540,876 | Great Britain | Nov. 4, 1941 |
| 542,136 | Belgium | Nov. 14, 1955 |